(12) United States Patent
Park et al.

(10) Patent No.: US 10,804,576 B2
(45) Date of Patent: Oct. 13, 2020

(54) ELECTROLYTE FOR LITHIUM-SULFUR BATTERY AND LITHIUM-SULFUR BATTERY COMPRISING SAME

(71) Applicant: LG CHEM, LTD., Seoul (KR)

(72) Inventors: In Tae Park, Daejeon (KR); Sung Won Hong, Daejeon (KR); Charles Kiseok Song, Daejeon (KR); Chang Hoon Lee, Daejeon (KR); Doo Kyung Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 116 days.

(21) Appl. No.: 15/755,984

(22) PCT Filed: Jan. 12, 2017

(86) PCT No.: PCT/KR2017/000394
§ 371 (c)(1),
(2) Date: Feb. 27, 2018

(87) PCT Pub. No.: WO2017/150801
PCT Pub. Date: Sep. 8, 2017

(65) Prior Publication Data
US 2018/0316068 A1    Nov. 1, 2018

(30) Foreign Application Priority Data

Mar. 3, 2016   (KR) .................. 10-2016-0025398
Jan. 10, 2017   (KR) .................. 10-2017-0003342

(51) Int. Cl.
*H01M 10/52*    (2006.01)
*H01M 10/052*   (2010.01)
(Continued)

(52) U.S. Cl.
CPC ......... *H01M 10/52* (2013.01); *H01M 10/052* (2013.01); *H01M 10/0567* (2013.01);
(Continued)

(58) Field of Classification Search
CPC ............... H01M 10/52; H01M 10/052; H01M 10/0569; H01M 4/36
See application file for complete search history.

(56) References Cited

U.S. PATENT DOCUMENTS 4,643,958 A    2/1987 Thrash et al.
4,816,358 A    3/1989 Holleck et al.
(Continued)

FOREIGN PATENT DOCUMENTS

CN    1930710 A    3/2007
CN    101960656 A    1/2011
(Continued)

OTHER PUBLICATIONS

European Search Report for Appl. No. 17760205.9 dated May 14, 2018.
(Continued)

*Primary Examiner* — Kenneth J Douyette
(74) *Attorney, Agent, or Firm* — Birch, Stewart, Kolasch & Birch, LLP

(57) ABSTRACT

The present invention relates to an electrolyte solution for a lithium-sulfur battery and a lithium-sulfur battery including the same.
The electrolyte solution for a lithium-sulfur battery according to the present invention exhibits excellent stability, and may improve a swelling phenomenon by suppressing gas generation during lithium-sulfur battery operation.

9 Claims, 2 Drawing Sheets

(51) Int. Cl.
*H01M 10/0567* (2010.01)
*H01M 10/0568* (2010.01)
*H01M 10/42* (2006.01)
*H01M 10/0569* (2010.01)
*H01M 4/38* (2006.01)

(52) U.S. Cl.
CPC ... *H01M 10/0568* (2013.01); *H01M 10/0569* (2013.01); *H01M 10/4235* (2013.01); *H01M 4/38* (2013.01); *H01M 2300/0025* (2013.01)

(56) References Cited

U.S. PATENT DOCUMENTS

| | | | |
|---|---|---|---|
| 2003/0096165 A1* | 5/2003 | Nakahara | H01M 4/13 429/213 |
| 2003/0190530 A1 | 10/2003 | Yang et al. | |
| 2004/0029014 A1* | 2/2004 | Hwang | H01M 4/04 429/246 |
| 2004/0029018 A1 | 2/2004 | Kim et al. | |
| 2004/0185347 A1 | 9/2004 | Kim et al. | |
| 2004/0259002 A1* | 12/2004 | Kim | H01M 10/0525 429/326 |
| 2005/0147891 A1 | 7/2005 | Mikhaylik | |
| 2006/0263695 A1* | 11/2006 | Dahn | H01M 10/0525 429/326 |
| 2010/0129723 A1 | 5/2010 | Noda et al. | |
| 2011/0003202 A1 | 1/2011 | Wakizaka et al. | |
| 2011/0014517 A1 | 1/2011 | Ryu et al. | |
| 2011/0195305 A1 | 8/2011 | Lee et al. | |
| 2012/0171563 A1 | 7/2012 | Kang et al. | |
| 2013/0108899 A1 | 5/2013 | Schaefer | |
| 2013/0287980 A1 | 10/2013 | Burdzy et al. | |
| 2013/0323605 A1 | 12/2013 | Yamamoto et al. | |
| 2014/0335399 A1 | 11/2014 | Mikhaylik | |
| 2014/0335427 A1 | 11/2014 | Khasanov et al. | |
| 2014/0353549 A1 | 12/2014 | Mayo | |
| 2015/0155548 A1 | 6/2015 | Ryoshi et al. | |
| 2016/0043386 A1* | 2/2016 | Charrier | H01M 4/133 429/213 |
| 2016/0172707 A1* | 6/2016 | Oh | H01M 4/38 429/144 |
| 2016/0285127 A1 | 9/2016 | Kim et al. | |
| 2018/0108946 A1 | 4/2018 | Scordilis-Kelley et al. | |

FOREIGN PATENT DOCUMENTS

| | | |
|---|---|---|
| CN | 103339783 A | 10/2013 |
| CN | 104157906 A | 11/2014 |
| CN | 104379509 A | 2/2015 |
| CN | 104733787 A | 6/2015 |
| CN | 105144460 A | 12/2015 |
| CN | 105322219 A | 2/2016 |
| EP | 2 688 126 A1 | 1/2014 |
| JP | 2-112266 A | 4/1990 |
| JP | 2001-283920 A | 10/2001 |
| JP | 2007-518229 A | 7/2007 |
| JP | 2013-530488 A | 7/2013 |
| JP | 2014-517857 A | 7/2014 |
| KR | 10-1990-0007729 B1 | 10/1990 |
| KR | 10-2004-0061572 A | 7/2004 |
| KR | 10-2004-0080775 A | 9/2004 |
| KR | 10-2008-0049038 A | 6/2008 |
| KR | 10-2011-0092549 A | 8/2011 |
| KR | 10-1106113 B1 | 1/2012 |
| KR | 10-1141058 B1 | 7/2012 |
| KR | 10-1167334 B1 | 7/2012 |
| KR | 10-2012-0090113 A | 8/2012 |
| KR | 10-2014-0071603 A | 6/2014 |
| KR | 10-2014-0132227 A | 11/2014 |
| KR | 10-2015-0028804 A | 3/2015 |
| KR | 10-1579330 B1 | 12/2015 |
| KR | 10-2016-0042525 A | 4/2016 |
| WO | WO 2005/061567 A1 | 7/2005 |
| WO | WO 2008/023895 A1 | 2/2008 |
| WO | WO 2009/107778 A1 | 9/2009 |
| WO | WO 2015/160381 A1 | 10/2015 |
| WO | WO-2015-190705 A1 * | 12/2015 ............ H01M 4/505 |

OTHER PUBLICATIONS

European Search Report for Appl. No. 17760205.9 dated Aug. 28, 2018.

International Search Report for PCT/KR2017/000394 (PCT/ISA/210) dated May 4, 2017 is attached herewith.

Mikhaylik et al., "High Energy Rechargeable Li-S Cells for EV Application. Status, Remaining Problems and Solutions", ECS Transactions, 2010, vol. 25, No. 34, pp. 23-34.

Indian Office Action for Appl. No. 201817007725 dated Nov. 15, 2019.

* cited by examiner

[Figure 1]
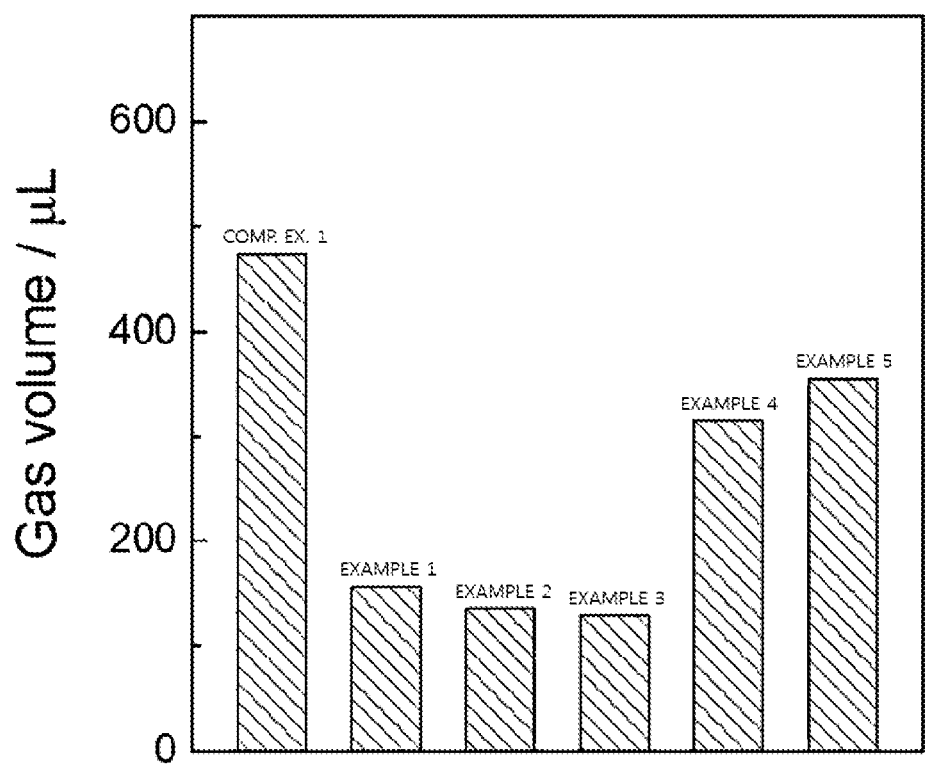

[Figure 2]
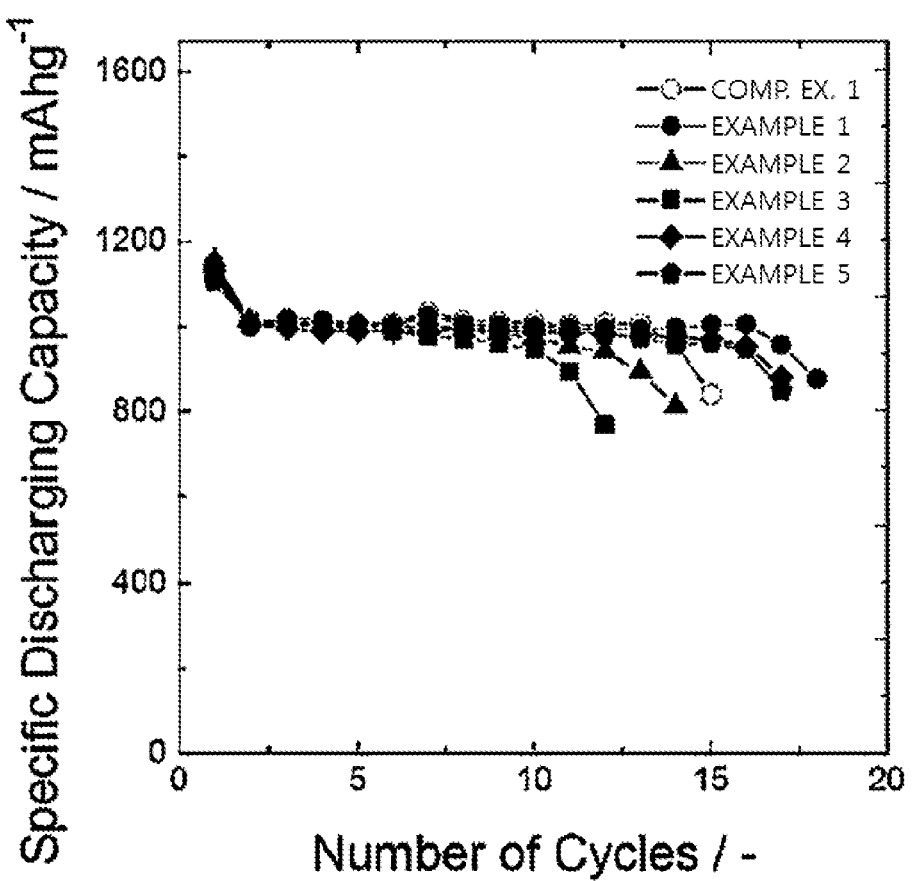

ELECTROLYTE FOR LITHIUM-SULFUR BATTERY AND LITHIUM-SULFUR BATTERY COMPRISING SAME

TECHNICAL FIELD

This application claims priority to and the benefits of Korean Patent Application No. 10-2016-0025398, filed with the Korean Intellectual Property Office on Mar. 3, 2016, and Korean Patent Application No. 10-2017-0003342, filed with the Korean Intellectual Property Office on Jan. 10, 2017, the entire contents of which are incorporated herein by reference.

The present invention relates to an electrolyte solution for a lithium-sulfur battery and a lithium-sulfur battery including the same.

BACKGROUND ART

With recent development of portable electronic devices, electric vehicles and large capacity power storage systems, demands for large capacity batteries have arisen. A lithium-sulfur battery is a secondary battery using a sulfur series material having sulfur-sulfur bonds (S—S bonds) as a positive electrode active material and using lithium metal as a negative electrode active material, and sulfur, a main material of a positive electrode active material, has advantages of being very abundant in resources, having no toxicity and having a low atomic weight.

In addition, a lithium-sulfur battery has theoretical discharge capacity of 1672 mAh/g-sulfur and theoretical energy density of 2,600 Wh/kg, which is very high compared to theoretical energy density of other battery systems currently studied (Ni-MH battery: 450 Wh/kg, Li—FeS battery: 480 Wh/kg, Li—MnO$_2$ battery: 1,000 Wh/kg, Na—S battery: 800 Wh/kg), and therefore, has received attention as a battery having a high energy density property.

While preparing a lithium-sulfur battery in large capacity using a common electrolyte solution and performing experiments thereon, the inventors of the present invention observed a swelling phenomenon in which gas is generated inside and the battery swells up during battery operation. Such a swelling phenomenon causes electrolyte solution depletion, battery deformation, and also causes active material deintercalation from electrodes resulting in a problem of declining battery performance.

Causes and generation mechanism of such a swelling phenomenon caused by gas generation inside a battery have not yet been identified, and accordingly, there are no countermeasures as well.

PRIOR ART DOCUMENTS

Korean Patent Application Laid-Open Publication No. 10-2012-0090113, Electrolyte for lithium secondary battery and lithium secondary battery including the same

DISCLOSURE

Technical Problem

In view of the above, the inventors of the present invention have studied electrolyte solution compositions of a lithium-sulfur battery, and as a result, have completed the present invention.

Accordingly, an aspect of the present invention provides an electrolyte solution for a lithium-sulfur battery significantly reducing an amount of gas generation during battery operation.

Another aspect of the present invention provides a lithium-sulfur battery including the electrolyte solution.

Technical Solution

According to an aspect of the present invention, there is provided an electrolyte solution for a lithium-sulfur battery including a lithium salt and a non-aqueous solvent, and further including a radical adsorbent.

Herein, the radical adsorbent may include one type selected from the group consisting of quinone-based compounds, N-oxyl radical-based compounds, phenol-based compounds, amine-based compounds, enol-based compounds, thiol-based compounds, azide-based compounds, cyclopropane derivatives, cyclobutane derivatives and combinations thereof.

Herein, the quinone-based compound may be one or more types selected from the group consisting of 1,2-benzoquinone, 1,4-benzoquinone, 1,2-naphthoquinone, 1,4-naphthoquinone, 9,10-anthraquinone, 1,4-anthraquinone, acenaphthoquinone and derivatives thereof.

Herein, the N-oxyl radical-based compound may be one or more types selected from the group consisting of 2,2,6,6-tetramethyl-1-piperidinyloxyl, 4-hydroxy-2,2,6,6-tetramethyl-1-piperidinyloxyl, 4-oxo-2,2,6,6,-tetramethyl-1-piperidinyloxyl, 4-amino-2,2,6,6-tetramethyl-1-piperidinyloxyl, 4-acetamido-2,2,6,6-tetramethyl-1-piperidinyloxyl, 4-methoxy-2,2,6,6-tetramethyl-1-piperidinyloxyl and 4-hydroxy-2,2,6,6-tetramethyl-1-piperidinyloxyl-benzoate.

Herein, the amine-based compound may be simazine, N1,N4-diphenylbenzene-1,4-diamine, or a combination thereof.

Herein, the radical adsorbent may be included in 0.01% to 5% by weight based on 100% by weight of the electrolyte solution.

Herein, the non-aqueous solvent may be one or more types selected from the group consisting of carbonate-based solvents, ester-based solvents, ether-based solvents, ketone-based solvents, alcohol-based solvents and aprotic solvents.

Herein, the lithium salt may be one type selected from the group consisting of LiCl, LiBr, LiI, LiClO$_4$, LiBF$_4$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, chloroborane lithium, lower aliphatic carboxylic acid lithium, lithium tetraphenylborate, lithium imide and combinations thereof.

Herein, the lithium salt may be included in a concentration of 0.2 M to 2.0 M.

The electrolyte solution of the present invention may further include an additive having N—O bonds in a molecule.

Herein, the additive may be one or more types selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitropyridine, dinitropyridine, nitrotoluene, dinitrotoluene, pyridine N-oxide, alkylpyridine N-oxide and tetramethylpiperidinyloxyl.

Herein, the additive may be included in 0.01% to 10% by weight based on 100% by weight of the electrolyte solution.

According to another aspect of the present invention, there is provided a lithium-sulfur battery including the electrolyte solution.

Advantageous Effects

A electrolyte solution for a lithium-sulfur battery according to the present invention has excellent stability and has a significantly small amount of gas generation during battery operation. As a result, a swelling phenomenon of a battery can be improved.

DESCRIPTION OF DRAWINGS

FIG. 1 is a graph comparing amounts of gas generation of Experimental Example 1.

FIG. 2 is a graph comparing battery life time properties of Experimental Example 2.

BEST MODE

Hereinafter, embodiments of the present invention will be described in detail with reference to accompanying drawings so that those skilled in the art may readily implement the present invention. However, the present invention may be implemented in various different forms, and is not limited to the examples described herein.

Electrolyte Solution for Lithium-Sulfur Battery

In order to improve a swelling phenomenon caused by gas such as hydrogen generated during lithium-sulfur battery operation, the present invention provides an electrolyte solution for a lithium-sulfur battery including a lithium salt and a non-aqueous solvent, and further including a radical adsorbent.

From experimental results obtained by the inventors of the present invention, when using a common electrolyte solution formed with a non-aqueous solvent and a lithium salt in large batteries such as large area pouch cells, gas such as hydrogen, methane and ethane is generated in considerable amounts and a swelling phenomenon by which the battery is swollen is observed. The phenomenon and the cause of generation have not been reported yet, but are considered to be due to electrolyte solution instability. Particularly, sulfur radicals produced during battery operation are considered as a cause of electrolyte solution decomposition and resulting gas generation.

The electrolyte solution according to the present invention further includes a radical adsorbent in order to reduce side reactions caused by radicals. The electrolyte solution of the present invention exhibits enhanced stability when used in a lithium-sulfur battery without declining battery properties such as battery life time and efficiency. As a result, problems of electrolyte solution decomposition and gas generation are improved during battery operation, and problems of performance decline caused by electrolyte solution loss and battery active material deintercalation from electrodes, and quality decline caused by battery deformation may be overcome.

The radical adsorbent of the present invention is not particularly limited as long as it is capable of performing a role of preventing electrolyte solution decomposition by first reacting with radical materials concomitantly generated during lithium-sulfur battery operation before the radical materials react with the electrolyte solution, and includes conjugation compounds readily receiving electrons, stable radical compounds, compounds having unsaturated bonds, and the like.

The radical adsorbent may be a quinone-based compound. The quinone-based compound has a conjugation structure and thereby is capable of performing an electron receiving role. Specifically, the quinone-based compound may be one or more types selected from the group consisting of 1,2-benzoquinone, 1,4-benzoquinone, 1,2-naphthoquinone, 1,4-naphthoquinone, 9,10-anthraquinone, 1,4-anthraquinone, acenaphthoquinone and derivatives thereof.

In addition, the radical adsorbent may be an N-oxyl radical-based compound. The N-oxyl radical-based compound has a stable radical structure, and may be used as an oxidation catalyst. Specifically, the N-oxyl radical-based compound may be one or more types selected from the group consisting of 2,2,6,6-tetramethyl-1-piperidinyloxyl, 4-hydroxy-2,2,6,6-tetramethyl-1-piperidinyloxyl, 4-oxo-2,2,6,6-tetramethyl-1-piperidinyloxyl, 4-amino-2,2,6,6-tetramethyl-1-piperidinyloxyl, 4-acetamido-2,2,6,6-tetramethyl-1-piperidinyloxyl, 4-methoxy-2,2,6,6-tetramethyl-1-piperidinyloxyl and 4-hydroxy-2,2,6,6-tetramethyl-1-piperidinyloxyl-benzoate.

In addition thereto, nonlimiting examples of the radical adsorbent may include phenol-based compounds such as 2,6-di-tert-butyl-4-methylphenol (BHT), thiodiethylene bis [2-(3,5-di-tert-butyl-4-hydroxyphenyl)propionate], octadecyl-3-(3,5-di-tert-butyl-4-hydroxyphenyl)propionate or tetrakis[methylene-3-(3,5-di-tert-butyl-4-hydroxyphenyl) propionate]methane, amine-based compounds such as simazine (6-chloro-N,N'-diethyl-1,3,5-triazine-2,4-diamine) or N1,N4-diphenylbenzene-1,4-diamine, enol-based compounds, thiol-based compounds, azide-based compounds, cyclopropane derivatives, cyclobutane derivatives and the like, and these radical adsorbents may be used either alone or as a mixture.

The content of the radical adsorbent is preferably from 0.01% to 5% by weight based on 100% by weight of the electrolyte. When the radical adsorbent content is less than the above-mentioned range, effects of preventing electrolyte solution decomposition and gas generation during battery operation are insignificant, and when the content is greater than the above-mentioned range, involuntary side reactions may occur, and therefore, the content is properly controlled within the above-mentioned range. In addition, when the radical adsorbent content is in a range of 0.5% to 2% by weight, an effect of enhancing a battery life time property may also be obtained as well as an effect of preventing gas generation, and therefore, the radical adsorbent content is more preferably in a range of 0.5% to 2% by weight.

The solvent of the electrolyte solution according to the present invention is not particularly limited as long as it is a non-aqueous solvent performing a role of a medium through which ions involving in an electrochemical reaction of a battery may migrate, and specifically, carbonate-based solvents, ester-based solvents, ether-based solvents, ketone-based solvents, alcohol-based solvents or aprotic solvents may be used.

As the carbonate-based solvent, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC) or the like may be used, however, the carbonate-based is not limited thereto.

As the ester-based solvent, methyl acetate, ethyl acetate, n-propyl acetate, 1,1-dimethylethyl acetate, methyl propionate, ethyl propionate, γ-butyrolactone, decanolide, valerolactone, mevalonolactone, caprolactone or the like may be used, however, the ester-based is not limited thereto.

As the ether-based solvent, diethyl ether, dipropyl ether, dibutyl ether, dimethoxymethane (DMM), trimethoxymethane (TMM), dimethoxyethane (DME), diethoxyethane (DEE), diglyme, triglyme, tetraglyme, tetrahydrofuran, 2-methyltetrahydrofuran, polyethylene glycol dimethyl ether or the like may be used, however, the ether-based is not limited thereto.

Examples of the ketone-based solvent may include cyclohexanone or the like. In addition, as the alcohol-based solvent, ethyl alcohol, isopropyl alcohol or the like may be used, and as the aprotic solvent, nitriles such as acetonitrile, amides such as dimethylforamide, dioxolanes such as 1,3-dioxolane (DOL), sulfolane or the like may be used.

The non-aqueous organic solvent may be used either alone, or as a mixture of one or more thereof, and when used as a mixture of one or more thereof, the mixing ratio may be properly controlled depending on target battery performance. When considering lithium-sulfur battery properties, the ether-based solvent described above is preferably used as the non-aqueous solvent. As one example, a mixed solvent employing a 50:50 1,3-dioxolane (DOL) to 1,2-dimethoxyethane (DME) volume ratio, or a mixed solvent employing a 50:50 tetrahydrofuran (THF) to 1,2-dimethoxyethane (DME) volume ratio may be used.

The electrolyte solution of the present invention includes a lithium salt added to the electrolyte solution for increasing ion conductivity. The lithium salt is not particularly limited in the present invention, and those that may be commonly used in lithium secondary batteries may be used without limit. Specifically, the lithium salt may be one type selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, chloroborane lithium, lower aliphatic carboxylic acid lithium, lithium tetraphenylborate, lithium imide and combinations thereof, and is preferably (CF$_3$SO$_2$)$_2$NLi.

The concentration of the lithium salt may be determined considering ion conductivity and the like, and is preferably from 0.2 M to 2.0 M, or 0.5 M to 1.6 M. When the lithium salt concentration is less than the above-mentioned range, ion conductivity suitable for battery operation is difficult to secure, and when the concentration is greater than above-mentioned range, lithium ion mobility may decrease due to increase in viscosity of the electrolyte solution, and battery performance may decline due to an increase in the decomposition reaction of the lithium salt itself, and therefore, the concentration is properly controlled within the above-mentioned range.

The non-aqueous electrolyte solution for a lithium-sulfur battery of the present invention may further include an additive having N—O bonds in the molecule. The additive is effective in forming a stable film on a lithium electrode and greatly enhancing charge and discharge efficiency. Such an additive may be a nitrate- or nitrite-based compound, a nitro compound and the like. As one example, one or more types selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitropyridine, dinitropyridine, nitrotoluene, dinitrotoluene, pyridine N-oxide, alkylpyridine N-oxide, and tetramethylpiperidinyloxyl may be used. According to one example of the present invention, lithium nitrate (LiNO$_3$) may be used.

The additive is used in a range of 0.01% to 10% by weight and preferably 0.1% to 5% by weight based on 100% by weight of the whole electrolyte solution composition. When the content is less than the above-mentioned range, the above-mentioned effects may not be secured, and when the content is greater than the above-mentioned range, resistance may increase due to the film, and therefore, the content is properly controlled within the above-mentioned range.

As described above, a radical absorbent is added to the electrolyte solution for a lithium-sulfur battery according to the present invention for securing electrolyte solution stability during battery operation, and accordingly, gas generation in a battery may be suppressed during charge and discharge of the battery, and a swelling phenomenon may be improved.

A method for preparing the electrolyte solution according to the present invention is not particularly limited in the present invention, and common methods known in the art may be used.

Lithium-Sulfur Battery

A lithium-sulfur battery according to the present invention includes a positive electrode, a negative electrode, a separator interposed therebetween, and a electrolyte solution, and as the electrolyte solution, the non-aqueous electrolyte solution for a lithium-sulfur battery according to the present invention is used.

The lithium-sulfur battery according to the present invention has significantly reduced generation of gas such as hydrogen gas during operation, and may improve a problem of battery performance decline caused by active material deintercalation from electrodes and quality decline caused by battery deformation.

The constitution of the positive electrode, the negative electrode and the separator of the lithium-sulfur battery is not particularly limited in the present invention, and may follow constitutions known in the art.

Positive Electrode

The positive electrode according to the present invention includes a positive electrode active material formed on a positive electrode current collector.

As the positive electrode current collector, those capable of being used as a current collector in the art may all be used, and specifically, foamed aluminum, foamed nickel or the like having excellent conductivity may be preferably used.

The positive electrode active material may include elemental sulfur (S8), sulfur series compounds or mixtures thereof. The sulfur series compound may specifically be Li$_2$S$_n$ (n≥1), an organosulfur compound, a carbon-sulfur polymer ((C$_2$S$_x$)$_n$: x=2.5 to 50, n≥2) or the like. These are used as a composite with a conductor since a sulfur material alone does not have electrical conductivity.

The conductor may be porous. Accordingly, as the conductor, those having porosity and conductivity may be used without limit, and for example, carbon-based materials having porosity may be used. As such carbon-based materials, carbon black, graphite, graphene, active carbon, carbon fiber and the like may be used. In addition, metallic fibers such as metal mesh; metallic powders such as copper, silver, nickel and aluminum; or organic conductive materials such as polyphenylene derivatives may also be used. The conductive materials may be used either alone or as a mixture.

The positive electrode may further include a binder for binding of the positive electrode active material and the conductor and for binding on the current collector. The binder may include a thermoplastic resin or a thermosetting resin. For example, polyethylene, polyethylene oxide, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoro ethylene copolymer, an ethylene-acrylic acid copolymer and the like may be used either alone or as a mixture, however, the binder is not limited thereto, and those capable of being used as a binder in the art may all be used.

Such a positive electrode may be prepared using common methods, and specifically, may be prepared by coating a composition for forming a positive electrode active material layer prepared by mixing a positive electrode active material, a conductor and a binder in an organic solvent on a current collector and drying the result, and selectively, compression molding the result on the current collector for enhancing electrode density. Herein, as the organic solvent, those capable of uniformly dispersing the positive electrode active material, the binder and the conductor, and readily evaporating are preferably used. Specifically, acetonitrile, methanol, ethanol, tetrahydrofuran, water, isopropyl alcohol and the like may be included.

Negative Electrode

The negative electrode according to the present invention includes a negative electrode active material formed on a negative electrode current collector.

The negative electrode current collector may specifically be selected from the group consisting of copper, stainless steel, titanium, silver, palladium, nickel, alloys thereof and combinations thereof. The stainless steel may be surface treated with carbon, nickel, titanium or silver, and aluminum-cadmium alloys may be used as the alloy. In addition thereto, baked carbon, non-conductive polymers of which surface is treated with a conductor, conductive polymers or the like may also be used.

As the negative electrode active material, a material capable of reversibly intercalating or deintercalating lithium ions ($Li^+$), a material capable of reversibly forming a lithium-containing compound by reacting with lithium ions, lithium metal or a lithium alloy may be used. Examples of the material capable of reversibly intercalating or deintercalating lithium ions ($Li^+$) may include crystalline carbon, amorphous carbon or a mixture thereof. Examples of the material capable of reversibly forming a lithium-containing compound by reacting with lithium ions ($Li^+$) may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

The negative electrode may further include a binder for binding of the negative electrode active material and the conductor and for binding on the current collector, and specifically, the binder is the same as the binder of the positive electrode described above.

In addition, the negative electrode may be lithium metal or a lithium alloy. As nonlimiting examples, the negative electrode may be a thin film of lithium metal, or may be an alloy of lithium and one or more types of metals selected from the group consisting of Na, K, Rb, Cs, Fr, Be, Mg, Ca, Sr, Ba, Ra, Al and Sn.

Separator

A common separator may be interposed between the positive electrode and the negative electrode. The separator is a physical separator having a function of physically separating electrodes, and those commonly used as a separator may be used without particular limit, and particularly, those having an excellent electrolyte moisture retention ability while having low resistance for ion migration of the electrolyte solution are preferred.

In addition, the separator enables lithium ion transfer between the positive electrode and the negative electrode while separating or insulating the positive electrode and the negative electrode from each other. Such a separator may be formed with porous, and non-conductive or insulating materials. The separator may be an independent member such as a film, or a coating layer added to the positive electrode and/or the negative electrode.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

The positive electrode, the negative electrode and the separator included in the lithium-sulfur battery may each be prepared using common components and preparation methods, and although not particularly limited thereto, appearances of the lithium-sulfur battery may include a cylinder-type, a square-type, a pouch-type, a coin-type using a can, and the like.

Hereinafter, preferred examples are provided in order to illuminate the present invention, however, the following examples are for illustrative purposes only, and it is obvious to those skilled in the art that various changes and modifications may be made within the scope and technological ideas of the present invention, and such changes and modifications also belong to the attached claims.

EXAMPLE

Examples 1 to 5 and Comparative Example 1

(1) Preparation of Electrolyte Solution

A non-aqueous electrolyte solution of Comparative Example 1 was prepared by adding 1.0 M of LiTFSI (($CF_3SO_2$)$_2$NLi) and 1% by weight of $LiNO_3$ to a mixed solvent of 1,3-dioxolane (DOL) and 1,2-dimethoxyethane (DME) in a 50:50 volume ratio.

Non-aqueous electrolyte solutions of Examples 1 to 5 further including a radical adsorbent to the electrolyte solution composition of Comparative Example 1 were prepared. Electrolyte solution compositions of Examples 1 to 5 and Comparative Example 1 are shown in the following Table 1.

TABLE 1

| | Solvent | Lithium Salt and Additive | Radical Adsorbent |
|---|---|---|---|
| Example 1 | DOL:DME (50:50, v/v) | LiTFSI (1.0M), LiNO$_3$ (1% by Weight) | 1,4-Benzoquinone (1% by Weight) |
| Example 2 | | | 1,4-Benzoquinone (3% by Weight) |
| Example 3 | | | 1,4-Benzoquinone (5% by Weight) |
| Example 4 | | | TEMPO (1% by Weight) |
| Example 5 | | | Simazine (1% by Weight) |
| Comparative Example 1 | | | — |

(2) Manufacture of Lithium-Sulfur Battery

65% by weight of sulfur, 25% by weight of carbon black, and 10% by weight of polyethylene oxide were mixed with acetonitrile to prepare a positive electrode active material. The positive electrode active material was coated on an aluminum current collector, and the result was dried to prepare a positive electrode having a size of 30 mm$^2$×50 mm$^2$ and a loading amount of 5 mAh/cm$^2$. In addition, lithium metal having a thickness of 150 μm was employed as a negative electrode.

The prepared positive electrode and the negative electrode were placed to face each other, and a polyethylene separator was interposed therebetween, and the result was filled with the electrolyte solution of Example 1 to 5 or Comparative Example 1 prepared above.

Experimental Example 1: Manufacture of Lithium-Sulfur Battery and Analysis on Amount of Gas Generation after Charge and Discharge Each of the lithium-sulfur batteries manufactured in the examples and the comparative example was charged and discharged 5 times with a C-rate of 0.1 C at 25° C., and then the amount of gas generation inside the battery was measured. The results are shown in the following Table 2 and FIG. 1.

As shown in the following Table 2, it was seen that, whereas the gas generation was 473 μL when a radical adsorbent was not included, Examples 1 to 5 including a radical adsorbent had reduced gas generation. In other words, an effect of suppressing gas generation was obtained by approximately 67% to 73% when adding 1,4-benzoquinone, by approximately 33% when adding TEMPO, and by approximately 25% when adding simazine.

TABLE 2

| | Solvent | Lithium Salt and Additive | Radical Adsorbent | Amount of Gas Generation (μL) |
|---|---|---|---|---|
| Example 1 | DOL:DME (50:50, v/v) | LiTFSI (1.0M), LiNO$_3$ (1% by Weight) | 1,4-Benzoquinone (1% by Weight) | 156 |
| Example 2 | | | 1,4-Benzoquinone (3% by Weight) | 135 |
| Example 3 | | | 1,4-Benzoquinone (5% by Weight) | 129 |
| Example 4 | | | TEMPO (1% by Weight) | 315 |
| Example 5 | | | Simazine (1% by Weight) | 354 |
| Comparative Example 1 | | | — | 473 |

Experimental Example 2: Evaluation on Battery Life Time Property

For each of the batteries manufactured in the examples and the comparative example, a capacity retention rate of the battery was measured while charging and discharging under the following condition, and the results are shown in FIG. 2.

Charge: C-rate of 0.1 C, voltage of 2.8 V, CC/CV (5% current cut at 0.1 C)

Discharge: C-rate of 0.1 C, voltage of 1.5 V, CC

When referring to FIG. 2, it was identified that the batteries of Examples 1 to 5 further including a radical adsorbent all exhibited a similar capacity retention rate with Comparative Example 1. Particularly, Examples 1, 4 and 5 including a radical adsorbent in 1% by weight exhibited a more enhanced life time property. From these results, it was identified that the electrolyte solution of the present invention had reduced gas generation without affecting battery performance, and as a result, may prevent a battery swelling phenomenon and enhance stability.

The invention claimed is:

1. A lithium-sulfur battery comprising:
   a positive electrode, wherein the positive electrode comprises a positive electrode active material, which comprises a sulfur series material having sulfur-sulfur bonds;
   a negative electrode;
   a separator, wherein the separator is interposed between the positive electrode and the negative electrode; and
   an electrolyte solution, wherein the electrolyte solution comprises:
   a lithium salt;
   a non-aqueous solvent; and
   a radical adsorbent,
   wherein the radical adsorbent is selected from the group consisting of: simazine, N1,N4-diphenylbenzene-1,4-diamine, and combinations thereof.

2. The lithium-sulfur battery of claim 1, wherein the radical adsorbent is included in 0.01% to 5% by weight based on 100% by weight of the electrolyte solution.

3. The lithium-sulfur battery of claim 1, wherein the non-aqueous solvent is one or more types selected from the group consisting of carbonate-based solvents, ester-based solvents, ether-based solvents, ketone-based solvents, alcohol-based solvents and aprotic solvents.

4. The lithium-sulfur battery of claim 1, wherein the lithium salt includes one type selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, chloroborane lithium, lower aliphatic carboxylic acid lithium, lithium tetraphenylborate, lithium imide and combinations thereof.

5. The lithium-sulfur battery of claim 1, wherein the lithium salt is included in a concentration of 0.2 M to 2.0 M.

6. The lithium-sulfur battery of claim 1, further comprising an additive having N—O bonds in a molecule.

7. The lithium-sulfur battery of claim 6, wherein the additive is one or more types selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitropyridine, dinitropyridine, nitrotoluene, dinitrotoluene, pyridine N-oxide, alkylpyridine N-oxide and tetramethylpiperidinyloxyl.

8. The lithium-sulfur battery of claim 6, wherein the additive is included in 0.01% to 10% by weight based on 100% by weight of the electrolyte solution.

9. An electrolyte solution for a lithium-sulfur battery, comprising:
   a lithium salt;
   a non-aqueous solvent; and
   a radical adsorbent,
   wherein the radical adsorbent comprises an amine-based compound which is simazine, N1,N4-diphenylbenzene-1,4-diamine, or combinations thereof.

* * * * *